United States Patent [19]
Yoshimoto

[11] 3,733,174
[45] May 15, 1973

[54] COVERED TYPE HEAT TREATMENT COMBUSTION FURNACE

[75] Inventor: Hiromu Yoshimoto, Aichi, Japan

[73] Assignee: Daido Steel Co., Ltd., Azo-Kuridashi, Hoshizaki-cho, Minami-ku, Nagoya-shi, Aichi-ken, Japan

[22] Filed: Mar. 10, 1971

[21] Appl. No.: 122,962

[30] Foreign Application Priority Data

Mar. 13, 1970 Japan..................................45/20810

[52] U.S. Cl...................432/199, 266/5 B, 432/206, 432/179
[51] Int. Cl.............................................F23l 15/04
[58] Field of Search....................263/20, 41, 42 R; 266/5 B

[56] References Cited

UNITED STATES PATENTS

| | | | |
|---|---|---|---|
| 1,341,031 | 5/1920 | Amsler | 263/42 R |
| 3,540,710 | 11/1970 | Yamugishi | 263/41 |
| 2,998,236 | 8/1961 | Cramer et al. | 263/40 R |
| 3,476,368 | 11/1969 | Saiki | 263/20 |
| 2,099,967 | 11/1937 | Spencer et al. | 263/42 R |
| 2,809,027 | 10/1957 | Peterson | 263/42 R |
| 3,515,380 | 6/1970 | Lazaridis | 263/42 |
| 1,648,001 | 11/1927 | Manker | 263/42 R |

*Primary Examiner*—John J. Camby
*Attorney*—Woodhams, Blanchard and Flynn

[57] ABSTRACT

A covered type heat treatment combustion furnace having a recuperative heat exchanger constructed as the roof of the furnace for preheating the combustion air.

2 Claims, 3 Drawing Figures

PRIOR ART

COVERED TYPE HEAT TREATMENT COMBUSTION FURNACE

BACKGROUND OF THE INVENTION

1. Field of the Invention

The present invention relates to an improved covered type heat treatment combustion furnace.

2. Description of the Prior Art

In a covered type heat treatment combustion furnace according to the prior art as illustrated in FIG. 1, such as a round bell type heat treatment furnace, for instance, used for heat treatment of coiled strips, the coils 3, or other material to be heated, are placed in the inner cover 2, separated by the respective separators 4 and resting on the base 11. An outside furnace body 1 having a refractory brick lining surrounds the inner cover 2. Further, a fan 9 is installed in the center of the base 11 for the purpose of circulating the gas atmosphere within the inner cover 2 so that a uniform heating of the material to be heated may be effected. A motor 10 connected directly with said fan is located outside the furnace. An exhaust hole 7 is provided in the roof 1' of the furnace body 1 and several ports for the burners 8 are located in the lower part of the furnace body 1.

In the round bell type heat treatment furnace which has a construction as mentioned in the foregoing, the inside of the inner cover 2 is filled with a protective inert gas so that the surface of the coils 3 may be protected from becoming oxidized so as to keep their brightness. The high temperature combustion gas produced by the burners 8 heats the coils 3 indirectly through the inner cover 2 while said combustion gas passes upwardly through the space between the furnace body 1 and the inner cover 2 and is exhausted through the exhaust hole 7, at which time it still retains a considerable amount of heat. The protective inert gas is forced by the fan 9 to pass upwardly along the wall of the inner cover 2, thence is turned toward the center through the respective separators 4, and thence flows downwardly through the central path formed by the center holes of the coils 3, and finally comes back to the suction side of the fan 9, thus the inert gas continuously recirculates inside the inner cover 2 in the direction indicated by the arrows. Usually the protective inert gas inside the inner cover 2 becomes more heated as it flows up along the wall of the inner cover 2 and is heated to the highest degree when it reaches the topmost coil, thus making it inevitable to overheat the upper edge A of the topmost coil 3.

SUMMARY OF THE INVENTION

The furnace according to this invention comprises the provision of a heat exchanger for preheating the combustion air at the roof of the furnace body of the covered type heat treatment combustion furnace, whereby the amount of the exhausted heat is decreased and therefore the thermal efficiency of heating the coils 3 is increased and further the aforementioned edge A of the coils is prevented from overheating.

BRIEF DESCRIPTION OF THE DRAWINGS

A detailed explanation shall be made in the following description as to the aforementioned drawings to describe a preferred embodiment of the bell type heat treatment furnace according to the present invention. In FIGS. 2 and 3 those component parts which correspond to parts already described with reference to FIG. 1 shall be identified by the same reference numerals as the ones used in FIG. 1. No explanation will be given here as to such component parts previously referred to. The following explanation will be directed specifically to such parts that differ from the conventional heat treatment furnace shown in FIG. 1.

Referring to FIGS. 2 and 3, there is provided a heat exchanger 6 in the roof 1' of the furnace body 1. An inlet conduit 12 and an outlet conduit 13 are attached to the heat exchanger 6 to take in and send out the combustion air to be supplied to the burners 8. In the heat treatment furnace having the aforementioned construction, the combustion gas coming from the burners 8 rises between the furnace body 1 and the inner cover 2 and heats the coils piled in the inner cover 2 indirectly in the same way as in the conventional heat treatment furnace indicated in FIG. 1. However, according to the present invention, the combustion gas goes around the outside of the manifolded pipes set inside the heat exchanger 6 and exits by way of the exhaust hole 7. On the other hand, the combustion air for the burners 8 coming in through the inlet hole 12 of the heat exchanger 6 is preheated by the combustion gas while it flows through the inside of the manifolded pipes, flows out through the outlet hole 13, and is supplied to the burners 8 by means of a duct which is not indicated in the drawing.

Figure 1:
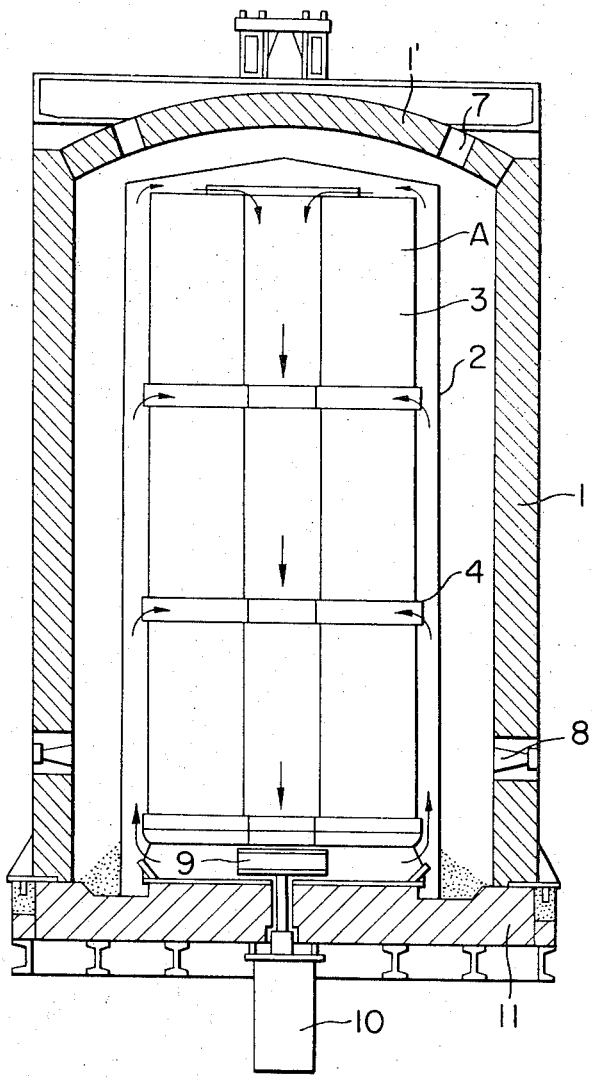
FIG. 1 is a central sectional view of a prior art furnace.
Figure 2:
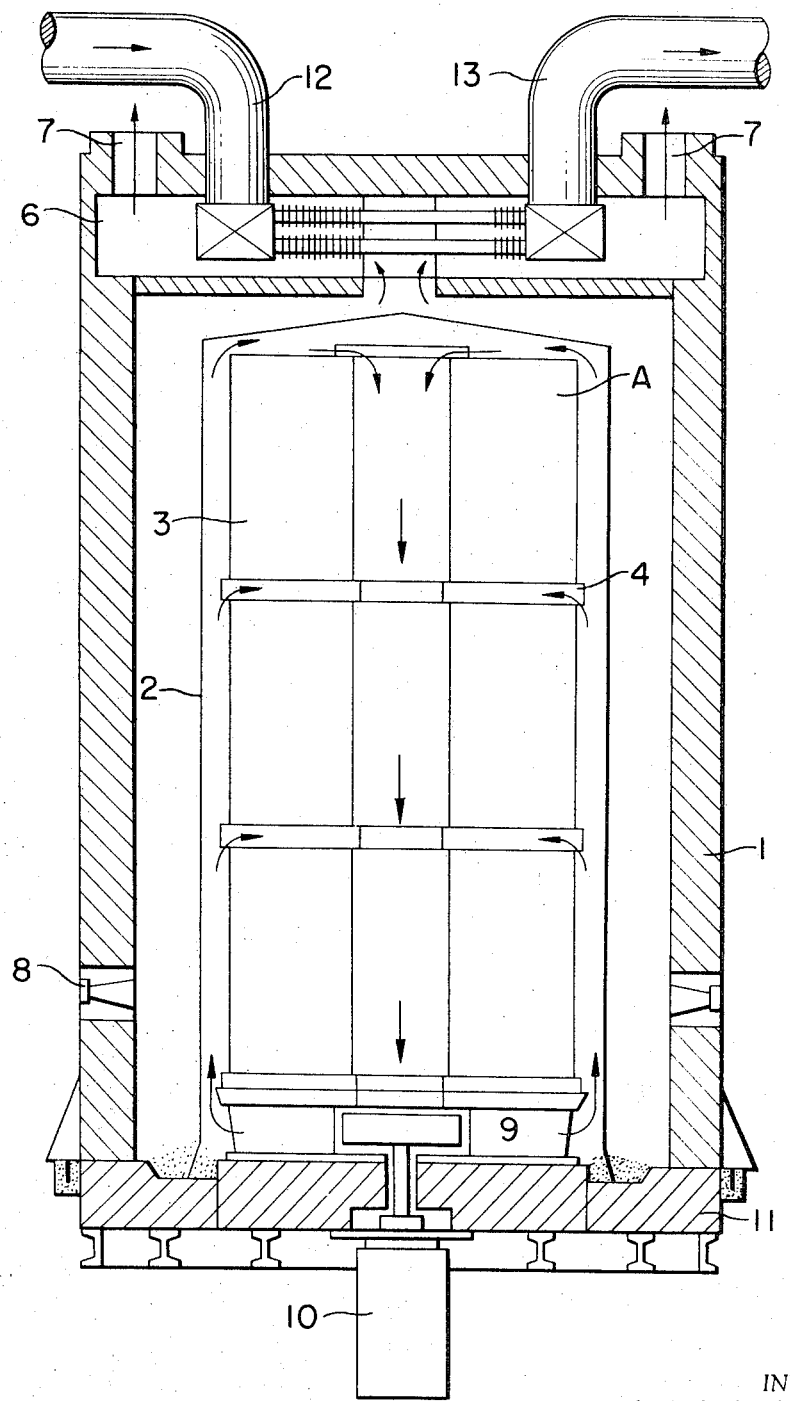
FIG. 2 is a sectional view of one of the embodiments of the heat treatment furnace according to the present invention.
Figure 3:
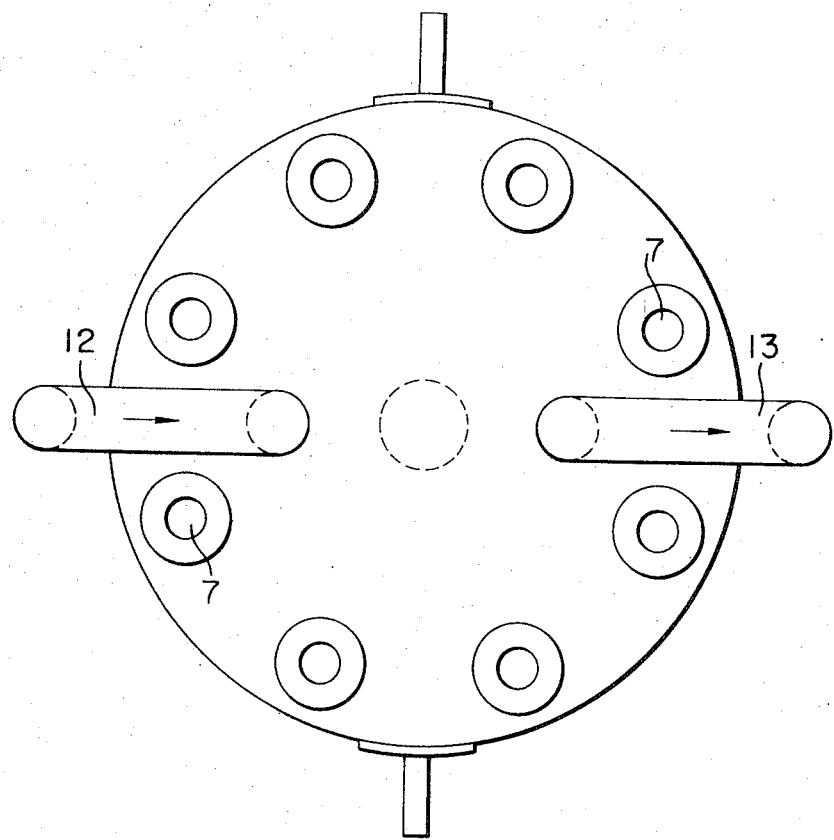
FIG. 3 is a top plan view of FIG. 2.

With the installation of the heat exchanger 6 according to the present invention, it is possible to increase the thermal efficiency by preheating the combustion air to be used for the burners 8 and also to prevent the upper edge A of the heated material from overheating by lowering the temperature near the top of the inside of the furnace and thus making the temperature more uniform over all the respective heated materials.

What is claimed is:

1. In a heat treatment furnace comprising an upright elongated outer furnace body having a side wall and a roof, an upright elongated inner bell-shaped cover located inside of said furnace body, said cover having a closed side wall and a closed top wall respectively spaced from said side wall and said roof of said furnace body and defining therewith a zone through which combustion gas can flow outside of said inner cover in order to heat materials inside said inner cover by indirect heat exchanger, the lower end of said cover being supported on and sealed to a base, burner means in the sidewall of said furnace body toward the lower end thereof for supplying combustion gas into said zone, and means for circulating protective gas within said inner cover, the improvement in which said roof has opening means in its lower side communicating with said zone adjacent the upper end thereof, said roof having internal heat exchange passage means therein, said passage means being disposed directly above and close to the upper end of said zone and communicating with said opening means for receiving combustion gas from the upper end of said zone, said roof having exhaust port means communicating with said passage means for discharging combustion gas from said roof; indirect heat exchange means disposed in said passage means; means for supplying air to said heat exchange means so that said air is heated by indirect heat exchange with said combustion gas flowing through said passage means to cool said combustion gas at the upper end of said zone and thereby reduce the temperature inside the upper end of said inner cover; and means for conducting said heated air from said heat exchange means to said burner means.

2. A heat treatment furnace according to claim 1, in which said opening means comprises a central opening in said roof, said passage means comprises a substantially horizontal passage in said roof communicating at its central region with said central opening, said heat exchange means comprises substantially horizontally extending pipe means positioned in said passage and extending from one side of said central opening to the other side thereof, said exhaust opening means comprising a plurality of openings at the outer portions of said passage whereby the combustion gas flows outwardly through said passage from the center thereof

* * * * *